(12) United States Patent
Kochukunjan et al.

(10) Patent No.: US 9,223,666 B2
(45) Date of Patent: Dec. 29, 2015

(54) DISASTER RECOVERY FOR DATABASES

(75) Inventors: Sunil Verghese Kochukunjan, Poughkeepsie, NY (US); Kondal Reddy Yennaram, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1720 days.

(21) Appl. No.: 12/493,794

(22) Filed: Jun. 29, 2009

(65) Prior Publication Data

US 2010/0332533 A1 Dec. 30, 2010

(51) Int. Cl.
*G06F 17/30* (2006.01)
*G06F 11/20* (2006.01)
*G06F 11/34* (2006.01)

(52) U.S. Cl.
CPC ........ *G06F 11/2097* (2013.01); *G06F 11/2038* (2013.01); *G06F 11/3409* (2013.01); *G06F 2201/81* (2013.01)

(58) Field of Classification Search
CPC ....................................................... G06F 17/30
USPC ........................... 707/648, 610, 770; 711/162
See application file for complete search history.

(56) References Cited

U.S. PATENT DOCUMENTS

| | | | |
|---|---|---|---|
| 5,758,150 A | 5/1998 | Bell et al. | |
| 6,038,665 A | 3/2000 | Bolt et al. | |
| 6,058,462 A | 5/2000 | West et al. | |
| 6,192,365 B1 | 2/2001 | Draper et al. | |
| 6,327,671 B1 | 12/2001 | Menon | |
| 6,408,310 B1 | 6/2002 | Hart | |
| 6,978,396 B2 | 12/2005 | Ruuth et al. | |
| 2003/0061537 A1 | 3/2003 | Cha et al. | |
| 2006/0085672 A1* | 4/2006 | Watanabe et al. | 714/6 |
| 2006/0242370 A1* | 10/2006 | Suzuki et al. | 711/162 |
| 2008/0228832 A1 | 9/2008 | Wetmore et al. | |

OTHER PUBLICATIONS

Polyzois et al., "Evaluation of Remote Backup Algorithms for Transaction-Processing Systems", ACM Transactions on Database Systems, vol. 19, No. 3, Sep. 1994, pp. 423-449.
Shen et al., "A Log Compression Algorithm for Operation-based Version Control Systems", Proceedings of the 26th Annual International Computer Software and Applications Conference (COMPSAC'02), 2002, pp. 1-6.
Bhalla, "Improving Parallelism in Asynchronous Reading of an Entire Database", Springer-Verlag Berlin 2000, HiPC2000, LNCS 1970 pp. 377-384.
Gray et al., "Transaction Processing: Concepts and Techniques," 1992, abstract, pp. 1-4.

* cited by examiner

*Primary Examiner* — Belix M Ortiz Ditren
(74) *Attorney, Agent, or Firm* — Yee & Associates, P.C.; Lisa Ulirich

(57) ABSTRACT

A method and apparatus for managing data in a database. A determination is made as to whether a number of logs created for a primary database located on a first computer system is ready for transfer to a second computer system. A number of sessions is identified based on resources available to transfer the number of logs across a network to the second computer system to form an identified number of sessions in response to a determination that the number of logs is ready to be transferred. The first computer system and the second computer system are in communication with the network. The number of logs is transferred from the first computer system to the second computer system using the identified number of sessions.

21 Claims, 4 Drawing Sheets

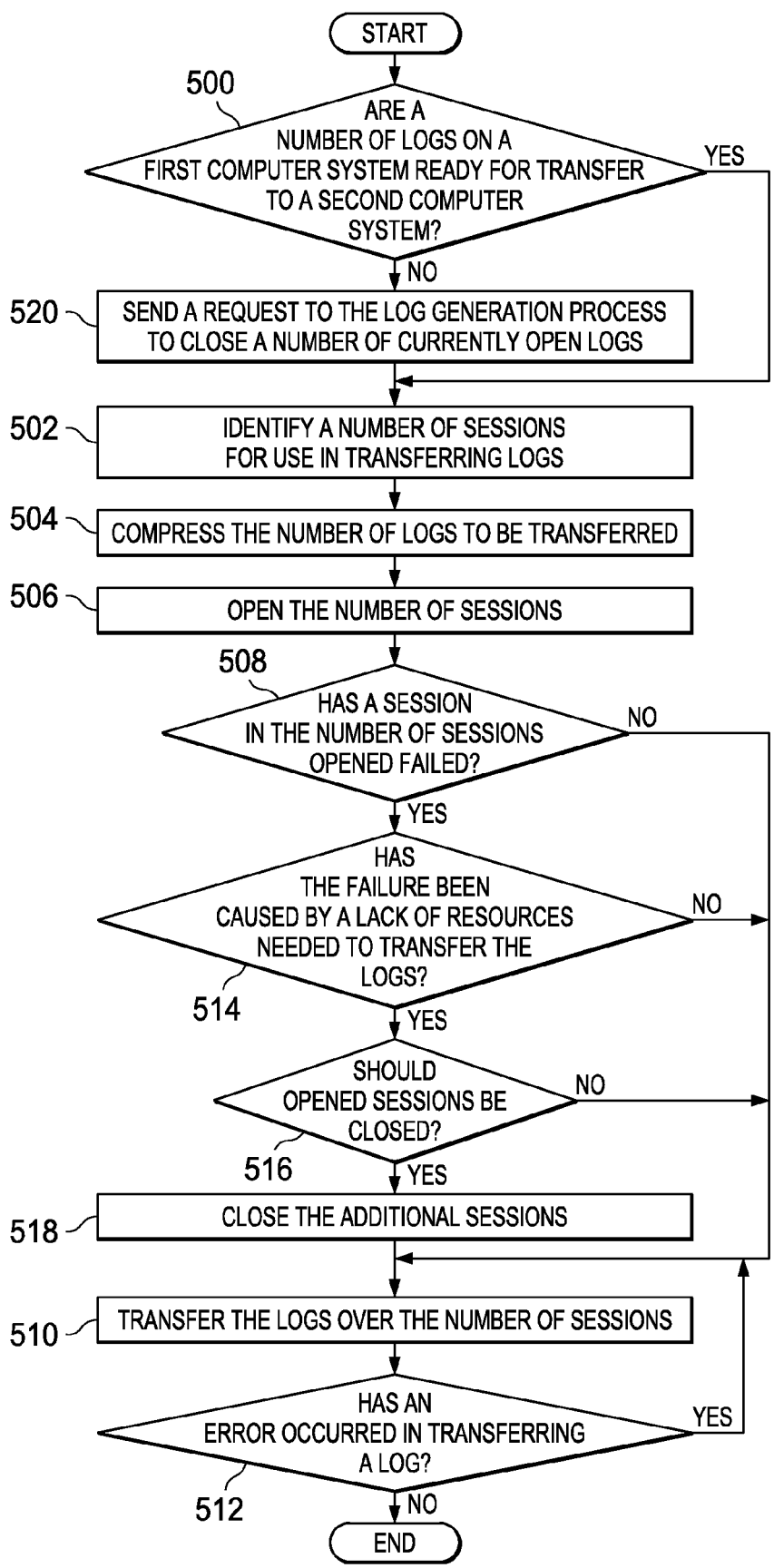

DISASTER RECOVERY FOR DATABASES

FIELD OF THE INVENTION

The present disclosure relates generally to an improved data processing system and, more specifically, to a method and apparatus for processing data. Still more specifically, the present disclosure relates to a method and apparatus for backing up data for use in disaster recovery.

BACKGROUND OF THE INVENTION

Most users backup data in case of hardware failure, data corruption, or other situations that may involve the loss of data. Backups to a computer can be made to a backup device. A backup device may be, for example, a tape drive, an optical disk drive, a hard drive, or other suitable devices. A backup device is attached to, integrated as part of, or otherwise associated with the computer on which the data is located.

This type of local backup provides a capability to restore data in the event that a hardware failure occurs in the computer. This type of backup, however, does not provide a suitable mechanism for restoring data in the event of a disaster. A disaster may be an event in which an extensive failure occurs. This failure may involve the loss or destruction of the computer and the backup device. Further, a disaster also may involve damage or loss of other equipment in the same location as the computer. For example, a disaster may be caused by environmental hazards, such as fire, flood, earthquake, power outages, malicious acts, operator errors, or other similar actions.

One solution is to use a remote backup device. For example, data on a computer may be backed up to a remote site. A backup process may copy data from a computer and send it to a remote storage device. Thus, if a disaster occurs, the data may be restored. Some data, however, may not be restored. Data that has been added to the computer since the last backup was performed is lost. Depending on how often a backup is made, the amount of data lost may not be unreasonable or crucial. Backups may be made daily, hourly, or even continuously, depending on the particular type of backup device used and the schedule that is set.

For many organizations and users, it is desirable and sometimes essential to provide continuous access to data and processing of data, even in the event of these types of failures. A backup copy of data, such as a secondary database, is often maintained at a remote geographic location. The distance between the location of a primary database and a secondary database may reduce the likelihood that the secondary database is also affected by a disaster affecting the primary database. In the event that a failure occurs in the primary database, location, processing of data, and access to the data may be directed to the secondary database.

Currently, many processes and techniques are available for synchronizing databases. One manner in which databases may be synchronized involves applying updates to both databases in a synchronous fashion. In other words, any writes or changes to the primary database are also made to the backup database before actually making the writes or changes to the primary database. Keeping the databases synchronized in this fashion has the benefit of ensuring a minimal loss of data in the event of a disaster.

Another manner in which databases may be synchronized involves generating a record of changes made to the primary database. These changes may then be sent asynchronously to the secondary database. These changes are oftentimes saved in a log generated at the primary database. These logs are then sent to the backup database to allow the backup database to make the same changes that occurred at the primary database.

SUMMARY

In an illustrative embodiment, a method and apparatus is provided for managing data in a database. A determination is made as to whether a number of logs created for a primary database located on a first computer system is ready for transfer to a second computer system. A number of sessions is identified based on resources available to transfer the number of logs across a network to the second computer system to form an identified number of sessions in response to a determination that the number of logs is ready to be transferred. The first computer system and the second computer system are in communication with the network. The number of logs is transferred from the first computer system to the second computer system using the identified number of sessions.

BRIEF DESCRIPTION OF THE SEVERAL VIEWS OF THE DRAWINGS

FIG. 5 is a flowchart of a process for transferring logs from a primary database to a secondary database in accordance with an illustrative embodiment.

DETAILED DESCRIPTION

Figure 1:
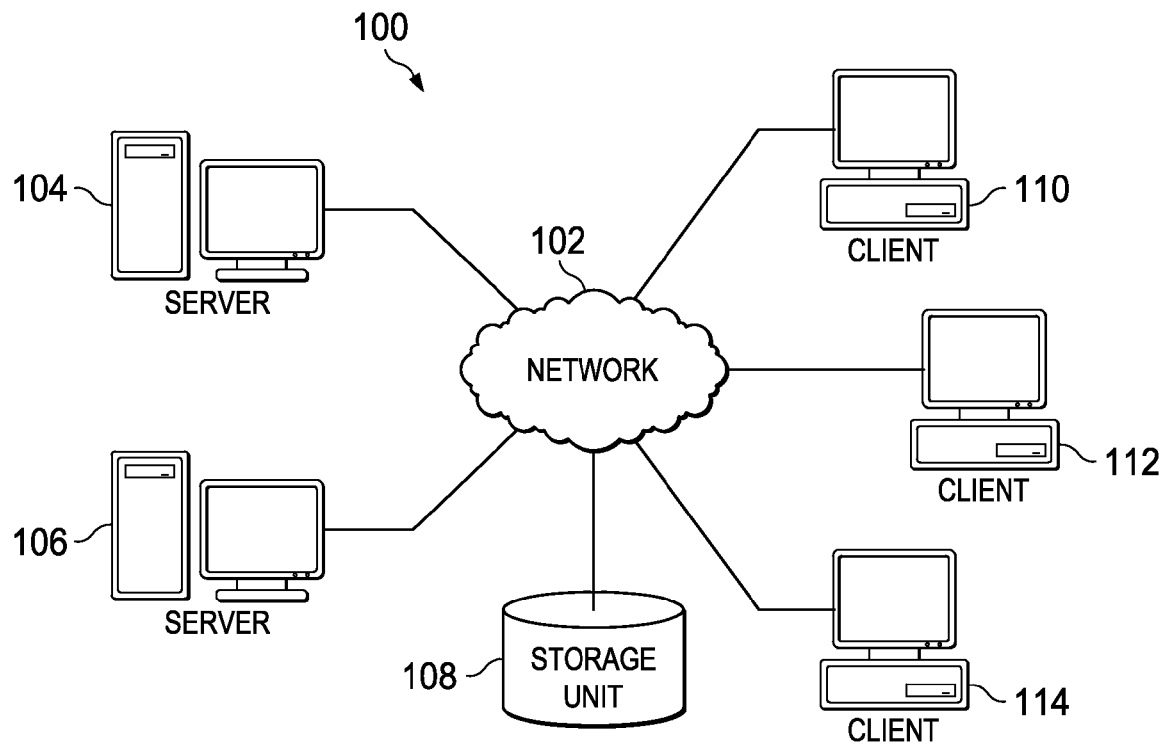
FIG. 1 is a pictorial representation of a network of data processing systems in which illustrative embodiments may be implemented.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium including, but not limited to, wireless, wireline, optical fiber cable, RF, or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language, or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the flowchart and/or block diagram block or blocks.

These computer program instructions also may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions also may be loaded onto a computer, other programmable data processing apparatus, or other devices to cause a series of operational steps to be performed on the computer, other programmable apparatus, or other devices to produce a computer implemented process such that the instructions, which execute on the computer or other programmable apparatus, provide processes for implementing the functions/acts specified in the flowchart and/or block diagram block or blocks.

Figure 2:
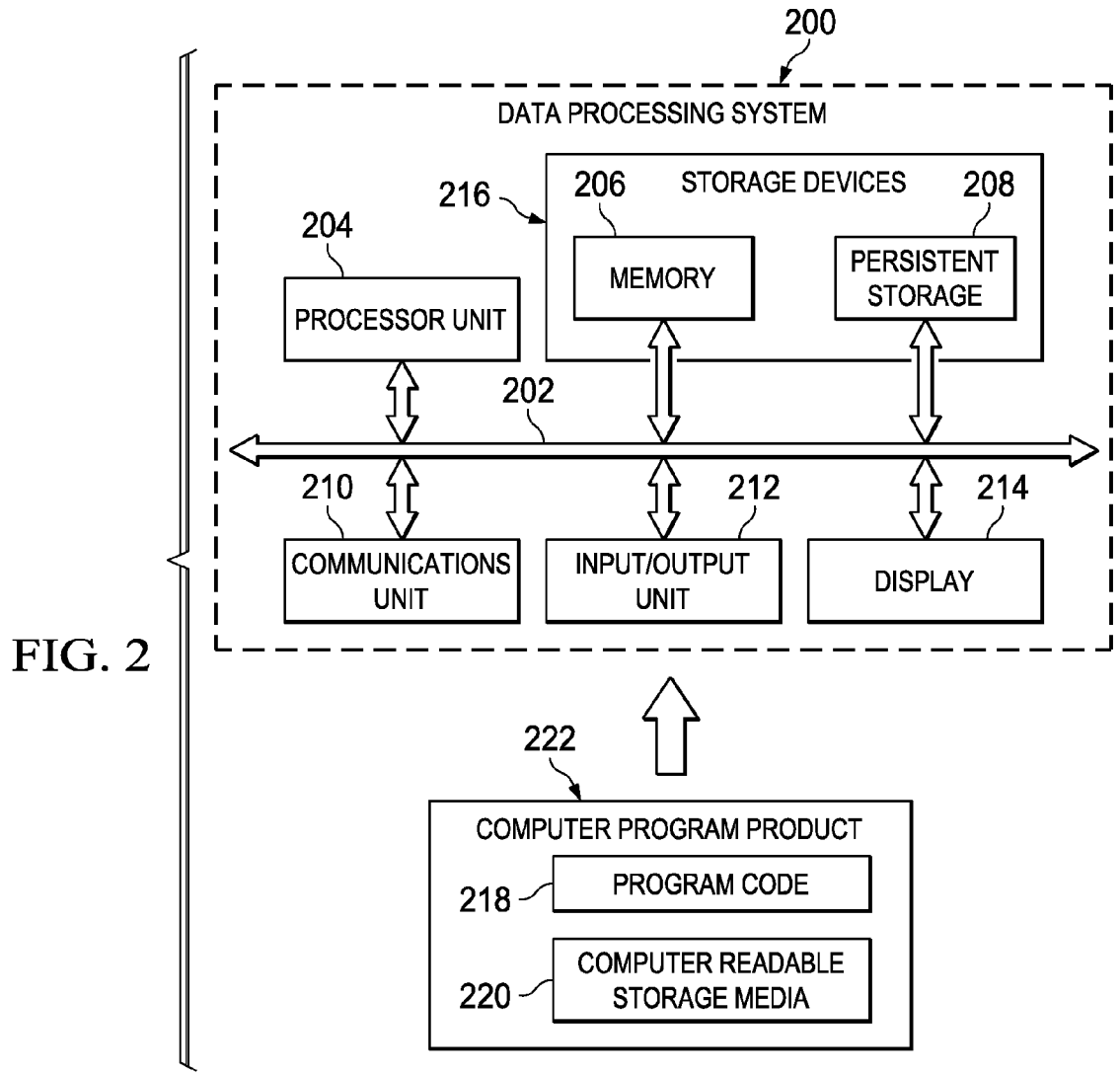
FIG. 2 is a diagram of a data processing system in accordance with an illustrative embodiment.

With reference now to the figures and, in particular, with reference to FIGS. 1-2, exemplary diagrams of data processing environments are provided in which advantageous embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which advantageous embodiments may be implemented. Network data processing system 100 is a network of computers in which the advantageous embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. For example, server 104 may contain a primary database, while server 106 may contain a secondary database. Clients 110, 112, and 114 may access server 104. In the event that server 104 is no longer accessible or the database at server 104 cannot be used, clients 110, 112, and 114 may access data at server 106. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks such as, for example, an intranet, a local area network (LAN), or a wide area network (WAN). FIG. 1 is intended as an example and not as an architectural limitation for the different illustrative embodiments.

The computer program instructions also may be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

With reference now to FIG. 2, a diagram of a data processing system is depicted in accordance with an illustrative embodiment. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222. Computer readable storage media 220 may include, for example, an optical or magnetic disk that is inserted or placed into a drive or other device that is part of persistent storage 208 for transfer onto a storage device, such as a hard drive, that is part of persistent storage 208. Computer readable storage media 220 also may take the form of a persistent storage, such as a hard drive, a thumb drive, or a flash memory, that is connected to data processing system 200. In some instances, computer readable storage media 220 may not be removable from data processing system 200.

Alternatively, program code 218 may be transferred to data processing system 200 using computer readable signal media. Computer readable signal media may be, for example, a propagated data signal containing program code 218. For example, computer readable signal media may be an electromagnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable signal media also may take the form of non-tangible media, such as communications links or wireless transmissions containing the program code.

In some illustrative embodiments, program code 218 may be downloaded over a network to persistent storage 208 from another device or data processing system through a computer readable signal media for use within data processing system 200. For instance, program code stored in computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor. As another example, a storage device in data processing system 200 is any hardware apparatus that may store data. Memory 206, persistent storage 208, and computer program product 222 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different illustrative embodiments recognize and take into account a number of different considerations. For example, the different illustrative embodiments recognize that although the use of logs may reduce issues that may occur if the backup database cannot be reached, the different illustrative embodiments recognize that using logs also may result in undesirable delays and limits to the amount of available bandwidth in a network. In these illustrative examples, a log is a file or suitable other data structure that contains changes to be made to a database.

The different illustrative embodiments recognize and take into account that the currently used processes for recording changes in logs at one database and sending the logs to another database for updating data can be time consuming and use up network resources. For example, a primary database sends information to a secondary database one log at a time. These logs may be very large in size. For example, a log may have 800 or more megabytes.

Also, depending on the bandwidth available, the number of logs present at the primary database may reduce availability or responsiveness of the database. The number of logs also may reduce the availability or responsiveness of the network on which the database is located. More specifically, the size and number of logs for transfer may cause other requests and transactions to be delayed or stalled. For example, the number of primary database logs and the size of the logs may cause the database to delay or stall other transactions in a manner that is noticeable by other users.

Thus, one or more of the illustrative embodiments provide a method and apparatus for synchronizing databases. In one illustrative embodiment, a determination is made as to whether a number of logs created for a primary database located on the first computer system is ready for transfer to a second computer system. In response to a determination that the number of logs are ready to be transferred, a number of sessions are identified based on resources available to transfer the number of logs across a network to the second computer system to form an identified number of sessions. The first computer system and the second computer system are in communication with the network. The number of logs is transferred from the first computer system to the second computer system using the number of identified sessions.

Figure 3:
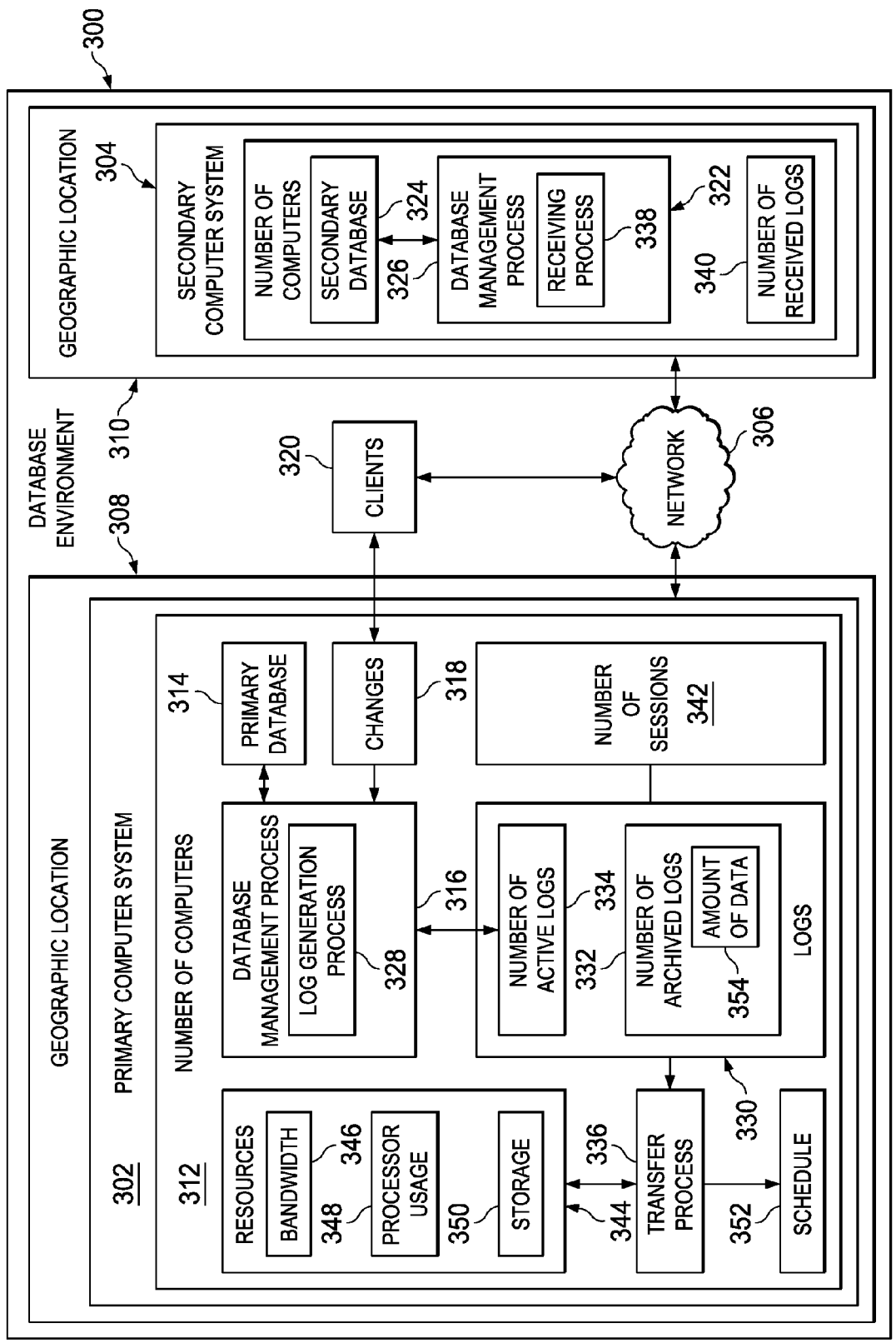
FIG. 3 is a diagram of a database environment in accordance with an illustrative embodiment.

Turning now to FIG. 3, a diagram of a database environment is depicted in accordance with an illustrative embodiment. Database environment 300 is an example of an environment that may be implemented in network data processing system 100 in FIG. 1.

In this illustrative example, database environment 300 includes primary computer system 302 and secondary computer system 304. These two systems are connected to network 306. Primary computer system 302 is located in geographic location 308, while secondary computer system 304 is located in geographic location 310, which is remote to geographic location 308 in these examples.

Primary computer system 302 includes number of computers 312. As used herein, a number, when referring to items, means one or more items. For example, a number of computers is one or more computers. Number of computers 312 may be implemented using one or more of data processing system 200 in FIG. 2.

In this illustrative example, primary database 314 and database management process 316 are located on primary computer system 302. Primary database 314 may be located on one computer within number of computers 312, while database management process 316 may be located on another computer. In yet other illustrative examples, both primary database 314 and database management process 316 may be located on the same computer in number of computers 312 in primary computer system 302. Primary database 314 is a structured collection of data stored on one or more of number of computers 312. This data is stored in the form of records in these examples.

Database management process 316 is a software component that manages the storage of data within primary database 314. Database management process 316 handles changes 318 made to primary database 314. Changes 318 may include, for example, without limitation, adding new data, deleting data, overwriting data, and other changes to primary database 314. Changes 318 may be made in response to requests from clients 320.

In these illustrative examples, primary database 314 is replicated on secondary database 324 to provide a backup of data in primary database 314. As a result, if an event occurs that renders primary database 314 unusable and/or inaccessible, secondary database 324 is used in place of primary database 314. For example, damage may occur to number of computers 312, data may become corrupted in primary database 314, access to number of computers 312 may be cut off or prevented on network 306, and/or some other event may occur causing primary database 314 to be inaccessible by clients 320.

In this illustrative example, secondary database 324 and database management process 326 are located on number of computers 322 in secondary computer system 304. Secondary computer system 304 comprises number of computers 322. The computers in number of computers 322 also may be implemented using a data processing system such as, for example, data processing system 200 in FIG. 2.

Secondary database 324 is synchronized with primary database 314 in these illustrative examples. In other words, as changes 318 are received and made to primary database 314, changes 318 are propagated to secondary database 324. In these examples, log generation process 328 in database management process 316 generates logs 330 containing changes 318. These logs are used to propagate changes 318 from primary database 314 to secondary database 324. In these illustrative examples, logs 330 include number of archived logs 332 and number of active logs 334. Number of archived logs 332 are logs that have been completed and are ready for transfer to secondary computer system 304. Number of active logs 334 are logs that are still being written by log generation process 328.

In these illustrative examples, a log may be considered an archived log when the log has not been changed for some period of time in an archive directory. In other illustrative examples, log generation process 328 may generate a message indicating that a log is present as part of number of archived logs 332. Log generation process 328 may send this message to transfer process 336. The message may include identification of the log, such as a file name or a path to the file.

Transfer process 336 sends number of archived logs 332 to receiving process 338 in database management process 326. In response to receiving number of archived logs 332, receiving process 338 updates secondary database 324 with the changes in number of received logs 340.

In these illustrative examples, number of archived logs 332 are transferred by transfer process 336 to receiving process 338 using number of sessions 342. Transfer process 336 identifies number of sessions 342 for use in sending number of archived logs 332 to receiving process 338 in data management process 326. Additionally, each session in number of sessions 342 may be used concurrently or simultaneously with other sessions within number of sessions 342. In other words, the different sessions within number of sessions 342 may be parallel sessions.

Number of session 342 may be identified using at least one of the number of logs ready to be transferred, an amount of bandwidth available, performance criteria, and other suitable factors.

In some examples, the identification of number of sessions 342 is performed based on resources 344 available to transfer number of archived logs 332 from primary computer system 302 to secondary computer system 304 over network 306. Resources 344 include at least one of bandwidth 346, processor usage 348, storage 350, and other suitable types of resources used to transfer data. Bandwidth 346 is a rate of data transfer over network 306. Processor usage 348 is processor resources used on one or both of primary computer system 302 and secondary computer system 304 to transfer number of archived logs 332. Storage 350 may be available storage, such as random access memory, hard disk drives, and other storage devices on these computer systems.

In these illustrative examples, one log in number of archived logs 332 is transferred over a session within number of sessions 342. In some advantageous embodiments, more than one log may be transferred using a session. Further, these sessions may be over the same connection or a different connection between primary computer system 302 and secondary computer system 304.

Transfer process 336 also generates schedule 352. In these examples, schedule 352 identifies when data in logs 330 should be transferred from primary computer system 302 to secondary computer system 304 over number of sessions 342. In these illustrative examples, the selection of number of sessions 342 may be made ahead of time or when a transfer of logs 330 is to occur. Schedule 352 may be selected in a manner that avoids reducing resources 344 available to transfer data below a threshold or desired level. For example, in some illustrative embodiments, it may be undesirable to use more than around 50 percent of the available amounts of bandwidth 346. Number of sessions 342 and schedule 352 may be selected to avoid this situation.

In identifying schedule 352 and number of sessions 342, transfer process 336 takes into account amount of data 354 in number of archived logs 332. As a result, transfer process 336 takes into account resources 344 available for use needed to transfer number of archived logs 332 from primary computer system 302 to secondary computer system 304 as well as amount of data 354. In these illustrative examples, schedule 352 may change as resources 344 change within network 306. Schedule 352 may provide for transfers of number of archived logs 332 on a periodic basis and/or based on particular events.

Further, transfer process 336 may cause log generation process 328 to close a log within number of active logs 334 to generate an archived log within number of archived logs 332 prior to the log normally being closed. In one example, transfer process 336 may cause log generation process 328 to close logs after the logs reach a desired size as compared to the size of the logs normally generated. For example, if logs in number of active logs 334 are normally closed when the logs reach a size of around 800 megabytes, transfer process 336 may cause a log having a smaller size, such as around 600 megabytes, to be closed. Additionally, by closing a log prior to the normal size at which a log is closed, faster synchronization or backing up of changes 318 may occur.

In these examples, a log is closed when changes 318 are no longer written to the log. When a log is closed, the log becomes an archived log and is ready for transfer in these examples.

Although the sizes of around 800 megabytes and around 600 megabytes are described in the illustrative examples, the size of logs may vary, depending on the particular implementation. If a log is closed prior to the log reaching the size when a log is normally closed, the smaller size may be selected. This smaller size may be selected as one that reduces use of resources 344. This reduction in the use of resources 344 may be one that allows for transfer of number of archived logs 332 without using an amount of resources 344 that is greater than some desired level of usage.

The closing of logs at an earlier time may be performed in response to schedule 352. For example, if schedule 352 indicates that a transfer of logs is to be made from primary database 314 to secondary database 324, transfer process 336 determines whether number of archived logs 332 is present for transfer. If no logs are present for transfer, transfer process 336 may cause log generation process 328 to close one or more logs in number of active logs 334. These closed logs may then be transferred to secondary database 324.

The illustration of database environment 300 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, log generation process 328 may be a process separate from database management process 316. Log generation process 328 may be located on a different computer from database management process 316. As yet another example, in some illustrative embodiments, receiving process 338 may be integrated as part of database management process 326. Further, network 306 may be comprised of multiple networks. For example, network 306 may be a local area network and a wide area network connected to each other. In yet other advantageous embodiments, network 306 also may include the Internet.

As another example, in the different illustrative embodiments, number of archived logs 332 may be compressed and/or encrypted prior to transfer using number of sessions 342 over network 306 to secondary computer system 304. The compression of number of archived logs 332 may reduce the amount of data that is transferred over network 306 through number of sessions 342 in a manner that may reduce the use of resources 344 that are available. Further, encryption of number of archived logs 332 may protect sensitive and/or confidential information in number of archived logs 332 from being viewed by unauthorized users.

As yet another example, transfer process 336 may monitor updates and may determine that secondary database 324 is behind in updates from primary database 314 beyond a desired threshold or amount. Transfer process may measure the amount of updates by, for example, without limitation, the size of the log or logs, or the time since a log has been transferred. This situation may cause transfer process 336 to generate an indication that secondary database 324 is out of synchronization from primary database 314.

Figure 4:
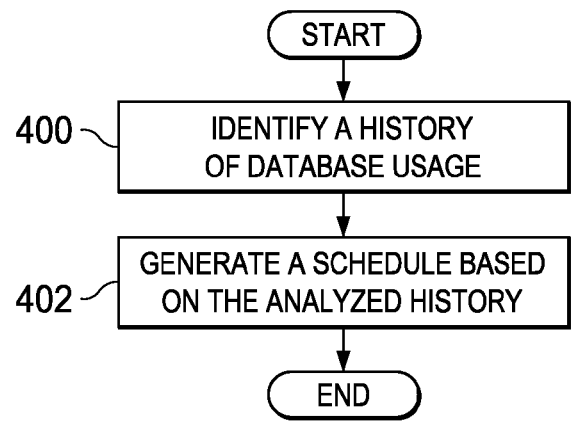
FIG. 4 is a flowchart of a process for generating a schedule to transfer logs in accordance with an illustrative embodiment.

With reference now to FIG. 4, a flowchart of a process for generating a schedule to transfer logs is depicted in accordance with an advantageous embodiment. In this illustrative example, the different steps in FIG. 4 may be implemented as computer usable program code in a functional form for execution by computers in database environment 300 in FIG. 3. For example, the process illustrated in FIG. 4 may be implemented with number of computers 312 executing program code for transfer process 336 in FIG. 3.

The program code for transfer process 336 is executed to identify a history of database usage (step 400). In step 400, transfer process 336 analyzes a history of use of primary database 314 by clients 320. The analysis may be used to identify times during which the primary database is known to be less busy. The program code for transfer process 336 is executed to generate a schedule based on the analyzed history (step 402), with the process terminating thereafter.

In this manner, a schedule, such as schedule 352, may be set to transfer archived logs in a manner that reduces the impact to the primary database computer system. For example, transfer process 336 may generate a schedule that performs more log transfers during periods of time in which the database usage is low as compared to other periods of time. For example, the schedule may set more frequent transfers during periods of time when the database is undergoing a volume of changes greater than a threshold level or for any other reason suitable for which a more frequent backup is desirable over a longer period of time.

Of course, the schedule may be generated using other processes other than the one illustrated in FIG. 4. For example, transfer process 336 may generate a schedule in which logs are transferred periodically.

The frequency during which the transfer of logs may occur also may be based on a priority level. A higher priority level may cause the process for transferring logs to occur at different periods of time. For example, logs may be transferred every hour, every five minutes, continuously, or for some other period of time. For example, the schedule may set transfers during certain periods of time when the database system is least used. This process may be performed by transfer process 336 periodically. The process may be performed in response to a periodic or non-periodic event.

Turning now to FIG. 5, a flowchart of a process for transferring logs from a primary database to a secondary database is depicted in accordance with an illustrative embodiment. The process illustrated in FIG. 5 may be implemented in the form of program code in a functional form. This program code may be executed to run a process to transfer logs from a primary database to a secondary database. In these illustrative examples, the process in FIG. 5 may be implemented with number of computers 312 executing program code for transfer process 336 in FIG. 3. This process may be initiated in response to a schedule, such as schedule 352 in FIG. 3.

The program code for transfer process 336 is executed to determine whether a number of logs created on the primary database on a first computer system are ready for transfer to a second computer system (step 500). In this depicted example, step 500 may involve determining whether archived logs are present in the database in this illustrative example. If logs are ready for transfer, the program code for transfer process 336 is executed to identify a number of sessions for use in transferring the logs (step 502). In this illustrative example, the number of sessions may be selected based on a number of resources available for use to transfer the logs. This number of resources may be, for example, the bandwidth available. In other examples, the number of resources considered in selecting the number of sessions may be bandwidth and processor usage. For example, if it is desirable not to use more than around 50 percent of the available bandwidth, then the number of sessions may be selected based on that parameter.

The program code for transfer process 336 is executed to compress the number of logs to be transferred (step 504). This operation also may include encrypting the logs, depending on the particular implementation. By compressing the number of logs, the amount of data to be transferred over the sessions may be reduced.

The program code for transfer process 336 is then executed to open the number of sessions (step 506). In these examples, the number of sessions selected does not exceed the number of logs to be transferred. For example, if four logs are present for transfer, only a maximum of four sessions are opened. In some cases, depending on the resources available and the constraints on those resources, the number of sessions may be less than the number of logs to be transferred.

After the sessions are started, the program code for transfer process 336 is executed to determine whether a session in the number of sessions opened has failed (step 508). If a session has not failed, the program code for transfer process 336 is executed to transfer the logs over the number of sessions (step 510). The program code for transfer process 336 is then executed to determine whether an error has occurred in transferring a log (step 512). In these examples, an error may be identified by determining whether the received log is of the correct size and by comparing check sums. If an error has not occurred, the process terminates. If an error has occurred in transferring one or more logs, the process returns to step 510 with transfer process 336 transferring the logs that have failed. In some embodiments, only the portions of a log that were not received or received with errors may be resent.

With reference again to step 508, if a session has failed, the program code for transfer process 336 is executed to determine whether the failure has been caused by a lack of resources needed to transfer the logs (step 514). If the failure is caused by a lack of resources being available, the program code for transfer process 336 is executed to determine whether opened sessions should be closed to reach a desired level of available resources (step 516). If additional sessions are to be closed, the program code for transfer process 336 is executed to close the additional sessions (step 518). The process then proceeds to step 510 as described above.

With reference again to step 500, if archived logs are not available, the program code for transfer process 336 is executed to send a request to the log generation process to close a number of currently open logs (step 520). When a currently open log file is closed, the process then proceeds to step 502. With reference again to step 516, if additional opened sessions are not to be closed, the process returns to step 510 as described above. Turning back to step 514, if the failure has not been caused by a lack of resources needed to transfer the logs, the process also returns to step 510.

In this manner, the synchronization of data between the databases may be performed more quickly. Further, the cost of compression and transfer also may be reduced by reducing the amount of time needed to transfer a log with a smaller size.

In this manner, one or more of the different illustrative embodiments provide a method and apparatus for processing data. In particular, the different illustrative embodiments provide a method and apparatus for synchronizing changes made at one database with another database. In the illustrative embodiments, the data may be transferred in a manner that reduces usage of resources available on a network. In one or more of the illustrative embodiments, to determine whether a number of logs created on a primary database located on a first computer system is ready for transfer to a second computer system. In response to a determination that the number of logs is ready to be transferred, a number of sessions are identified based on resources available to transfer the number of logs across a network to a second computer system. The number of identified sessions is used to transfer the number of logs in a first computer system to the second computer system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing data in a database, the method comprising:
   determining, by a processor unit, whether a number of logs created for a primary database located on a first computer system is ready for transfer to a second computer system via a network;
   responsive to a determination that the number of logs is ready to be transferred, identifying, by the processor unit, a number greater than one of the sessions based on available resources, to transfer the number of logs across the network to the second computer system;
   compressing, by the processor unit, the number of logs to form a number of compressed logs to reduce an amount of data transferred over the network reducing usage of the available resource; and
   transferring, by the processor unit, the number of logs from the first computer system to the second computer system via the network using the number greater than one of the sessions.

2. The method of claim 1 further comprising:
   responsive to an absence of the determination that the number of logs is ready to be transferred, closing, by the processor unit, a number of open logs to form the number of logs.

3. The method of claim 1, wherein the step of transferring, by the processor unit, the number of logs from the first computer system to the second computer system using the number greater than one of the sessions comprises:
   starting, by the processor unit, the number greater than one of the sessions; and
   sending, by the processor unit, the number of logs using the number greater than one of the sessions.

4. The method of claim 3, wherein the step of transferring, by the processor unit, the number of logs from the first computer system to the second computer system using the number greater than one of the sessions further comprises:
   responsive to a session within the number greater than one of the sessions failing to start, identifying, by the processor unit, a number of opened sessions;
   determining, by the processor unit, whether the resources available are within a selected level; and
   closing, by the processor unit, at least one opened session in the number of opened sessions in response to the resources available not being within the selected level.

5. The method of claim 3, wherein the step of transferring, by the processor unit, the number of logs from the first computer system to the second computer system using the number greater than one of the sessions further comprises:
   monitoring, by the processor unit, resources used to send the number of logs using the number greater than one of the sessions to form monitored resources; and
   responsive to a condition in which the monitored resources are greater than a desired level, closing, by the processor unit, at least one session in the number greater than one of the sessions.

6. The method of claim 3, wherein the step of transferring, by the processor unit, the number of logs from the first computer system to the second computer system using the number greater than one of the sessions further comprises:
   monitoring, by the processor unit, the transfer of the number of logs over the number greater than one of the sessions.

7. The method of claim 5, wherein the step of transferring, by the processor unit, the number of logs from the first computer system to the second computer system using the number greater than one of the sessions further comprises:
   determining, by the processor unit, whether an error occurred during the transfer of a log within the number of logs to the second computer system; and
   responsive to the determination that the error occurred, resending, by the processor unit, the log.

8. The method of claim 1 further comprising:
   updating a secondary database, by another processor unit, in the second computer system using the number of logs transferred from the first computer system to the second computer system using the number greater than one of the sessions.

9. The method of claim 8 further comprising:
   generating, by the processor unit, a schedule for transferring the number of logs from the primary database to the secondary database.

10. The method of claim 1, wherein the available resources are selected from at least one of bandwidth of the network, a processor of the first computer system, a processor of the second computer system, storage on the first computer system, and storage on the second computer system.

11. The method of claim 1, wherein the first computer system is located in a different geographic location than the second computer system.

12. The method of claim 1, wherein the number greater than one of the sessions to transfer the number of logs across the network to the second computer system is determined by the processor unit using at least one of the number of logs ready to be transferred, a size of each log in the number of logs, an amount of bandwidth available, and performance criteria.

13. A data processing system comprising:
   a processor unit, a memory, and a computer-readable, tangible storage device, first program code of determine whether a number of logs created for a primary database located on a first computer system is ready for transfer to a second computer system;
   second program code to determine a number greater than one of sessions based on available resources, to transfer the number of logs across a network to the second computer system in response to a determination that the number of logs is ready to be transferred;
   the processor unit executed the program code to compress, by the processor unit, the number of logs to form a number of compressed logs to reduce an amount of data transferred over the network reducing usage of the available resource; and
   third program code to transfer the number of logs from the first computer system to the second computer system using the number greater than one of the sessions, wherein the first program code, the second program code, and the third program code are stored in the computer-readable, tangible storage device for execution by the processor unit via the memory.

14. The data processing system of claim 13 further comprising:
   fourth program code to close a number of open logs to form the number of logs in response to an absence of the determination that the number of logs is ready to be transferred, wherein the fourth program code is stored in the computer-readable, tangible storage device for execution by the processor unit via the memory.

15. The data processing system of claim 13, wherein the third program code to transfer the number of logs from the first computer system to the second computer system using the number greater than one of the sessions further comprises:
   program code to start the number greater than one of the sessions and send the number of logs using the number greater than one of the sessions.

16. The data processing system of claim 15, wherein the third program code to transfer the number of logs from the first computer system to the second computer system using the number greater than one of the sessions further comprises:
   program code to identify a number of opened sessions in response to a session within the number greater than one of the sessions failing to start;
   program code to determine whether the resources available are within a selected level; and
   program code to close at least one opened session in the number of opened sessions in response to the resources available not being within the selected level.

17. A computer program product for managing data in a database, the computer program product comprising:
   a computer-readable, tangible storage device;
   program code, stored on the computer-readable, tangible storage device, for determining whether a number of logs created for a primary database located on a first computer system is ready for transfer to a second computer system;
   program code, stored on the computer-readable, tangible storage device, responsive to a determination that the number of logs is ready to be transferred, for determining a number greater than one of sessions based on available resources, to transfer the number of logs across a network to the second computer system;
   program code, stored on the computer-readable, tangible storage device, for compressing, the number of logs to form a number of compressed logs to reduce an amount of data transferred over the network reducing usage of the available resource; and
   program code, stored on the computer-readable, tangible storage device, for transferring the number of logs from the first computer system to the second computer system using the number greater than one of the sessions.

18. The computer program product of claim 17 further comprising:
   program code, stored on the computer-readable, tangible storage device, responsive to an absence of the determination that the number of logs is ready to be transferred, for closing a number of open logs to form the number of logs.

19. The computer program product of claim 17, wherein the program code, stored on the computer-readable, tangible storage device, for transferring the number of logs from the first computer system to the second computer system using the number greater than one of the sessions comprises:
   program code, stored on the computer-readable, tangible storage device, for starting the number greater than one of the sessions; and
   program code, stored on the computer-readable, tangible storage device, for sending the number of logs using the number greater than one of the sessions.

20. The method of claim 1, wherein the number greater than one of the sessions are concurrent sessions, and wherein the step of transferring, by the processor unit, the number of logs from the first computer system to the second computer system using the number greater than one of the concurrent sessions comprises:
   transferring in parallel at least two or more logs in the number of logs from the first computer system to the second computer system using the number greater than one of the concurrent sessions.

21. The method of claim 1, wherein the resource comprises a bandwidth of the network.

* * * * *